UNITED STATES PATENT OFFICE.

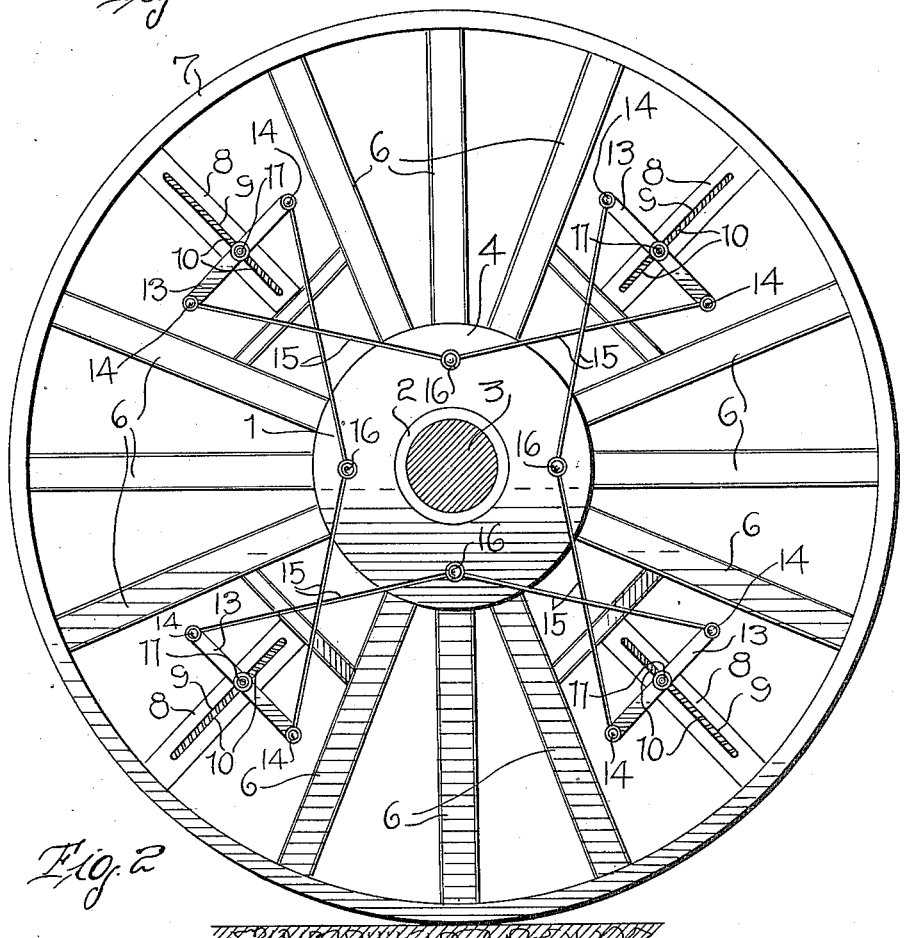
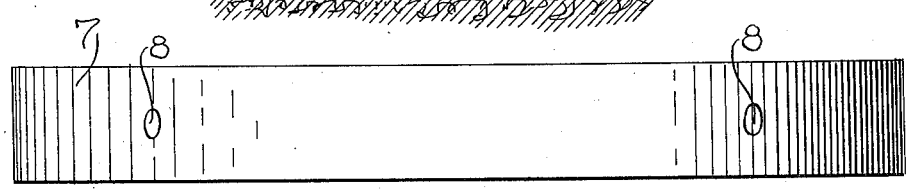

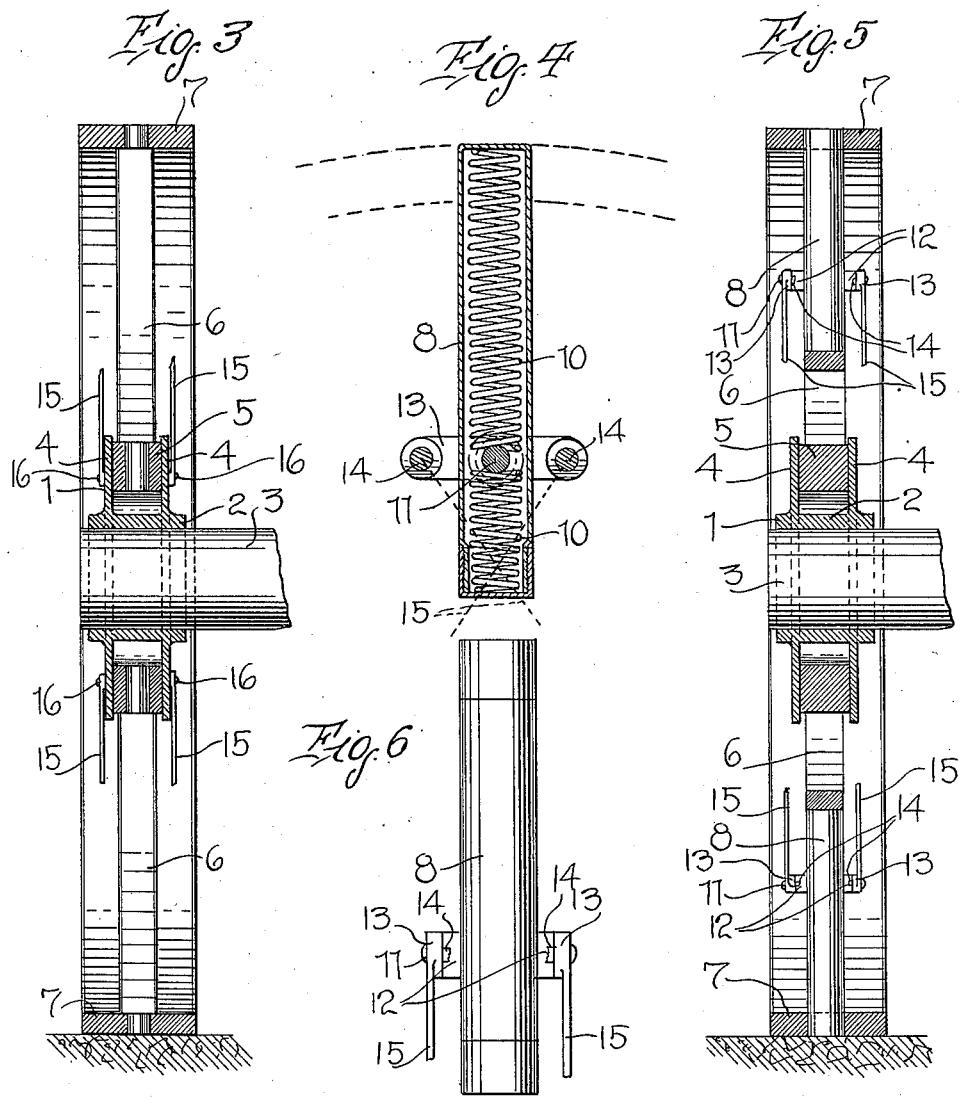

CHARLES W. RENZ, OF DILLER, NEBRASKA.

VEHICLE-WHEEL.

1,093,077.  Specification of Letters Patent.  Patented Apr. 14, 1914.

Application filed July 26, 1913. Serial No. 781,445.

*To all whom it may concern:*

Be it known that I, CHARLES W. RENZ, a citizen of the United States, residing at Diller, in the county of Jefferson and State of Nebraska, have invented certain new and useful Improvements in Vehicle-Wheels, of which the following is a specification, reference being had to the accompanying drawings.

This invention relates to new and useful improvements in vehicle wheels and more particularly to a spring wheel for motor vehicles and the like, the object of the invention being to provide a spring wheel which will absorb the shock and jar generally conveyed to the body of the vehicle when passing over rough and uneven roads.

Another object of the invention is to provide a spring wheel of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1 is a side elevation of a spring wheel constructed in accordance with my invention; Fig. 2 is a top plan view; Fig. 3 is a transverse sectional view showing the connecting bars secured to the hub plates; Fig. 4 is a longitudinal sectional view of the spring casings; Fig. 5 is a transverse sectional view of the wheel, showing the spring casings in position and the connecting bars pivoted to the transverse shafts; and Fig. 6 is a side elevation of the inner casing.

Referring more particularly to the drawings, 1 indicates the rigid hub portion of my improved vehicle wheel and consists of sleeve portions 2 mounted upon the spindle 3 and having spaced circular plates 4 secured to each end thereof. Mounted between the plates 4 is the movable hub 5 to which are secured the radially projecting spokes 6 and to the outer ends of these spokes is secured the rim 7. Arranged between certain of the spokes 6 are the elongated casings 8, the outer ends of which are secured to the inner face of the rim 7 in any suitable manner. The casings 8, which are cylindrical in form, are provided upon opposite sides thereof with alined slots 9. Arranged within the casings 8 are the coil springs 10 and disposed between the springs and having their ends projecting out through the slots 9 are the transverse shaft members 11 having a suitable boxing 12 carried thereby. Pivotally mounted upon each end of the shafts 11 are the transverse bars 13, the ends of which are connected by means of the bolts 14. The ends of the bars 13 are connected to the rigid hub 1 by means of the bars 15, the inner ends of which are crossed and arranged in spaced relation, as shown at 16. It will be readily seen from the disclosure shown in Fig. 2 that there is sufficient space between the movable hub 5 and the rigid hub 1 to permit enough movement of the hub 5 so as to absorb the shock and jar caused by traveling over rough and uneven roads.

From the above description taken in connection with the accompanying drawings, it will be readily apparent that should the rim 7 strike an object in the path of the vehicle, the shock thereof would be taken up through the springs 10 as the shafts 11 which are secured to the rigid hub by means of the springs and relieve the jar from the rigid hub 1. It will also be apparent from the above that my improved vehicle wheel is extremely simple in construction, contains very few parts and is inexpensive of manufacture.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the class described including a rigid hub, a second hub movable with respect to the rigid hub, radial spokes carried by the movable hub, a rim connecting the outer ends of said spokes, casings carried by said rim and having alined slots, coil springs in said casings, transverse shafts having their medial portions arranged between said springs and their ends projecting through said slots, transverse bars mounted upon the ends of said shafts and pivotal connecting means between said bars and the rigid hub.

2. A device of the class described including a rigid hub, a second hub movable with respect to the rigid hub, radial spokes carried by the movable hub, coil springs in said casings, transverse shafts having their medial portions arranged between said springs and their ends projecting through said slots, transverse bars mounted upon the ends of said shafts and rods having their outer ends pivotally connected to the ends of the transverse bars and their inner ends crossed and pivoted to the rigid hub as and for the purpose set forth.

In testimony whereof I hereunto affix my signature in the presence of two witnesses.

CHARLEY W. RENZ.

Witnesses:
W. E. ANDERSON,
A. MAYBORN.

Copies of this patent may be obtained for five cents each, by addressing the "Commissioner of Patents, Washington, D. C."